(12) United States Patent
Echigo et al.

(10) Patent No.: US 6,913,738 B1
(45) Date of Patent: Jul. 5, 2005

(54) SYSTEM FOR REMOVING CARBON MONOXIDE AND METHOD FOR REMOVING CARBON MONOXIDE

(75) Inventors: Mitsuaki Echigo, Kyotanabe (JP); Minoru Suzuki, Suita (JP); Osamu Okada, Osakasayama (JP)

(73) Assignee: Osaka Gas Co., Ltd. (JP)

( * ) Notice: Subject to any disclaimer, the term of this patent is extended or adjusted under 35 U.S.C. 154(b) by 0 days.

(21) Appl. No.: 09/914,994

(22) PCT Filed: Mar. 5, 1999

(86) PCT No.: PCT/JP99/01083
§ 371 (c)(1),
(2), (4) Date: Sep. 5, 2001

(87) PCT Pub. No.: WO00/53696
PCT Pub. Date: Sep. 14, 2000

(51) Int. Cl.[7] .......................... H01M 8/06; H01M 8/04; B01J 23/40; B01J 23/755
(52) U.S. Cl. .......................... 423/246; 429/17; 429/19; 422/177; 422/190; 422/211
(58) Field of Search .......................... 423/246; 422/177, 422/190, 211; 429/17, 13, 19

(56) References Cited

U.S. PATENT DOCUMENTS

| | | | |
|---|---|---|---|
| 5,436,086 A | * | 7/1995 | Seymour et al. ............... 429/17 |
| 6,183,895 B1 | * | 2/2001 | Kudo et al. .................... 429/20 |
| 6,190,430 B1 | * | 2/2001 | Fukuoka et al. ........... 48/198.3 |
| 6,290,913 B1 | * | 9/2001 | Aoyama ..................... 422/110 |

FOREIGN PATENT DOCUMENTS

| | | |
|---|---|---|
| JP | 511675 | 1/1976 |
| JP | 6220468 | 8/1994 |
| JP | 8133702 | 5/1996 |
| JP | 9131531 | 5/1997 |
| JP | 9266005 | 10/1997 |
| JP | 1029803 | 2/1998 |
| JP | 1029804 | 2/1998 |
| JP | 10212104 | 8/1998 |

OTHER PUBLICATIONS

English Abstract of JP7296837, published Nov. 10, 1995.
English Abstract of JP6283189, published Oct. 7, 1994.

* cited by examiner

Primary Examiner—Ngoc-Yen Nguyen
(74) Attorney, Agent, or Firm—The Webb Law Firm (57) ABSTRACT

The object of the present invention is to obtain a carbon-monoxide removing technique capable of very effectively reducing/removing carbon monoxide present at one thousand of ppm to several % in a hydrogen-rich treatment-object gas such as a reformed gas obtained by reforming of a fuel such as natural gas, methanol, etc. to a concentration of several tens of ppm (preferably 10 ppm) or lower without excessive loss of hydrogen, even when carbon dioxide, methane are co-existent For accomplishing this object, there are provided two stages of CO removers for removing carbon monoxide from a hydrogen-containing treatment-object gas, the first-stage CO remover removing a portion of the carbon monoxide by methanation thereof through a catalyst reaction, the second-stage CO remover removing the remaining portion of the carbon monoxide mainly by oxidation thereof through a further catalyst reaction involving addition of an oxidizing agent.

18 Claims, 1 Drawing Sheet

SYSTEM FOR REMOVING CARBON MONOXIDE AND METHOD FOR REMOVING CARBON MONOXIDE

BACKGROUND OF THE INVENTION

1. Field of the Invention

The present invention relates to the technique of removing carbon monoxide contained in a hydrogen-rich reformed gas (an example of "treatment-object gas" as so referred to in the present application) such as obtained e.g. in the reforming process of hydrocarbon fuels including natural gas, naphtha, kerosene, etc, or alcoholic fuels such as methanol.

The technique to which the present application relates is characterized that it can remove carbon monoxide up to a concentration of ten ppm or lower. For this ability, the-technique can be suitably employed in a power generating system using e.g. solid polymer electrolyte fuel cell which operates at a relatively low temperature.

For the purpose of simplifying the description, the following description will be made by taking a reformed gas used in a fuel cell as an example of the treatment-object gas.

2. Description of Related Art

Conventionally, with a fuel reforming apparatus using fossil fuel such as natural gas as raw fuel, a carbon monoxide shift converter is connected to the downstream end of the reformer so as to convert carbon monoxide in the reformed gas into carbon dioxide by the water-gas shift reaction, whereby the carbon monoxide concentration is reduced (removed) to 1% approximately.

On the other hand, with a fuel reforming apparatus using methanol as raw fuel, since this apparatus involves a step of the water-gas shift reaction, the carbon monoxide concentration is reduced (removed) to 1% approximately by appropriately maintaining the operating temperature and the water vapor ratio.

An example of an apparatus to which the reformed gas obtained above is to be fed is a polymer electrolyte fuel cell which is one type of fuel cell.

With this type of fuel cell, since it operates at a low temperature around about 80° C., if the reformed gas, as the fuel gas, contains carbon monoxide even by a trace amount (e.g. greater than several tens of ppm), its electrode catalyst is poisoned by the carbon monoxide, leading to significant deterioration in the cell performance. Therefore, it is necessary to reduce the carbon monoxide concentration in the fed reformed gas to less than several tens of ppm, more preferably to less than 10 ppm. In other words, the carbon monoxide concentration in the hydrogen-rich reformed gas needs to be reduced (removed) by a higher level than the conventional standard level (about 1%).

For the purpose of such relatively high level reduction of carbon monoxide, the method thus far has proposed the following methods.

(a) A CO remover having a metal catalysis is provided on the downstream of the reformer, so that with supply of air or oxygen as an oxidizing agent, carbon monoxide contained in the reformed gas is oxidized to be removed as carbon dioxide.

(b) A "methanator" is provided for causing reaction between hydrogen and carbon monoxide contained in the reformed gas, so that the carbon monoxide is reduced to be removed as methane.

Examples of the method (a) above include the following.

1. "The 2nd FCDIC Fuel Cell Symposium Lecture Proceedings: 235–240 (1995)". In this, air is mixed with the reformed gas so as to achieve: $[O_2]/[CO]=3$. Then, as this mixture gas is caused to contact Ru catalyst, carbon monoxide in the reformed gas is selectively oxidized and removed.

2. Japanese laid-open patent gazette: No. Hei. 7-296837: "Reformed-Gas Supplying System". In this, a methanol fuel reforming system includes a methanol retriever disposed at the downstream of a methanol reformer and also includes a carbon-monoxide oxidation reactor (acting as a CO remover) charged with Pt-Rh catalyst disposed at the downstream of the methanol retiever, so as to oxidize and remove the carbon monoxide in a methanol reformed gas.

Examples of the art (b) above include the following.

1. Japanese laid-open patent gazette No. Hei. 6-283189: "Fuel-Cell Power Generating System". In this, on the downstream of a CO shift converter, there are disposed a $CO_2$ adsorber and methanator having an Ni catalyst, so that some of carbon dioxide contained in the reformed gas is adsorbed and removed at the $CO_2$ adsorber and then carbon monoxide and the remaining carbon dioxide are methanated by the metanator to be removed as methane.

However, the above-described methods respectively have the following problems.

(a) problem with oxidation removal

In order to sufficiently remove carbon monoxide, it is necessary to add oxygen by an amount greater than 6 chemical equivalent. Then, not only the carbon monoxide to be removed, a great amount of hydrogen which can be a useful fuel will be lost by combustion (b) problem with removal using methanator With this technique, if the treatment-object gas contains also carbon dioxide as is the case with a reformed gas, methanation of carbon dioxide, in addition to that of carbon monoxide, tends to occur with very high likelihood For this reason, if carbon monoxide is to be removed sufficiently while restricting loss of hydrogen due to methanation of carbon dioxide, it is necessary to first absorb and remove the carbon dioxide also present in the reformed gas, so that the system required for this tends to be complicated.

SUMMARY OF THE INVENTION

The present invention has been made in order to solve the above-described problems, and its object is to obtain a carbon-monoxide removing technique capable of very effectively reducing/removing carbon monoxide present at one thousand of ppm to several % in a hydrogen-rich treatment-object gas such as a reformed gas obtained by reforming of a fuel such as natural gas, methanol, etc. to a concentration of several tens of ppm preferably 10 ppm) or lower without excessive loss of hydrogen (with minimizing the consumption of hydrogen), even when carbon dioxide, methane are co-existent.

For accomplishing this object, according to characterizing features of the present invention, a system for removing carbon monoxide from a hydrogen-containing treatment-object gas comprises two stages of CO removers for removing carbon monoxide, the first-stage CO remover removing a portion of the carbon monoxide by methanation thereof through a catalyst reaction, the second-stage CO remover removing the remaining portion of the carbon monoxide mainly by oxidation thereof through a further catalyst reaction involving addition of an oxidizing agent.

The carbon monoxide removing system of the invention includes two stages of first CO remover and second CO remover which are disposed in the mentioned order, that the treatment-object gas containing carbon monoxide is fed first into the first CO remover and then into the second CO remover whereby treatment-object gas having its carbon monoxide content removed is obtained from the second CO remover.

In the above, the removal of carbon monoxide by the first CO remover is methanation rein oval using catalyst reaction and that by the second CO remover is mainly oxidation removal using catalyst reaction involving addition of an oxidizing agent.

Accordingly, in removing process, at the first CO remover, by using hydrogen present in the surrounding, methanation of carbon monoxide is promoted for removal of then carbon monoxide, so that no oxidizing agent is required. By this catalyst reaction, a major part (more than half) of carbon monoxide present in the treatment-object gas may be methanated to be removed.

Subsequently, at the second CO remover, the remaining portion of the carbon monoxide is removed mainly through oxidation thereof by a catalyst reaction involving addition of an oxidizing agent. In this case, since the amount of the carbon monoxide has already been reduced, the remaining amount of carbon monoxide can be substantially entirely removed (to a concentration of several ppm approximately, for instance) with restricting the amount of the oxidizing agent to be added to the treatment-object gas.

Therefore, with this carbon-monoxide removing system, it is possible to restrict the amount of the oxidizing agent required for the removal to be smaller than the equivalent of the carbon monoxide entering the first CO remover. As a result, treatment-object gas free from carbon monoxide maybe obtained with limiting the amount of useful hydrogen to be consumed in the combustion.

Such removing system as described above may be applied as it is to a case where the treatment-object gas contains a certain amount (e.g. 20%) of carbon dioxide. This is a major characterizing feature of the present invention.

Preferably, in the carbon-monoxide removing system described above, the first CO remover includes a first metal catalyst comprising one or more kinds selected from the group consisting of Ru, Pt, Rh, Pd, etc and capable of methanating carbon monoxide and a first-catalyst reaction condition setting mechanism for maintaining a catalyst reaction layer of the remover at a temperature required for methanation reaction of the carbon monoxide by the first metal catalyst; and the second CO remover includes a second metal catalyst comprising one or more kinds selected from the group consisting of Ru, Pt, Rh, Pd, etc. and capable of oxidizing the carbon monoxide, a second-catalyst reaction condition setting mechanism for-maintaining a catalyst reaction layer of the remover at a temperature required for the oxidation reaction of the carbon monoxide by the second metal catalyst, and an oxidizing-agent supplying mechanism for supplying the oxidizing agent required for the oxidation reaction with adjustment of its addition amount.

With this system, both of the reaction at the first CO remover and that at the second CO remover involve metal catalysts, but different catalyst reaction from each other.

That is to say, at the first CO remover, the first metal catalyst is employed and the first-catalyst reaction condition setting mechanism is provided for providing the catalyst reaction condition for causing the methanation thereof, whereby the methanation of carbon monoxide is promoted to ensure its treatment amount.

On the other hand, at the second CO remover, the oxidizing agent required for the oxidation of the carbon monoxide is supplied from the oxidizing-agent supplying mechanism and also with the second-catalyst reaction condition setting mechanism, the reaction between this oxidizing agent and the carbon monoxide is effected by the second metal catalyst. With these, the carbon monoxide, which has already been reduced to a relatively small amount, can be removed mainly through the oxidation by the second metal catalyst.

Now, if the above-described treatment is effected on a reformed gas (such gas is obtained by reforming fuel such as hydrocarbon such as natural gas, alcohol such as methanol, naphtha, kerosene, etc., and usually contain hydrogen more than about 50% on the dry basis) to be supplied as a fuel gas to a fuel cell, the fuel cell can operate effectively by using the reformed gas from which carbon monoxide has been removed effectively. Hence, the present invention can be suitably applied especially to a solid polymer electrolyte fuel cell.

In the above, the construction of the carbon monoxide removing system of the invention has been described. Next, there will be described the invention's method of removing carbon monoxide using such system.

The method of removing carbon monoxide from a hydrogen-containing treatment-object gas, according to the present invention, is characterized by the following steps:

a) a first step of causing the treatment-object gas to contact a first metal catalyst capable of methanating carbon monoxide so that a portion of the carbon monoxide is removed through its methanation; and b) a second step of causing the treatment-object gas from the first step together with an oxidizing agent to contact a second metal catalyst capable of oxidizing carbon monoxide so that the remaining portion of carbon monoxide is removed mainly through its oxidation.

In the above, the first step corresponds to the process effected at the first CO remover of the invention's carbon monoxide removing system described above and the second step corresponds to the process effected at the second CO remover of the same.

By the same operating principle as described hereinbefore in the foregoing section describing the system, with this carbon monoxide removing method, the treatment-object gas substantially free from carbon monoxide may be obtained, with minimizing the amount of the oxidizing agent required for removal so as to reduce the amount of useful hydrogen consumed in the combustion. And, this removal is possible to a concentration of several ppm or lower to several tens of ppm. Also, this removal is possible even when the treatment-object gas contains e.g. about 20% of carbon dioxide, without involving treatment of this component.

Preferably, in the first step, a reaction temperature of catalyst reaction between a first metal catalyst and the treatment-object gas is controlled to a temperature at which methanation of carbon monoxide may be promoted with restricting methanation of carbon dioxide, so as to reduce the carbon monoxide concentration of the treatment-object gas to be obtained from this step as much as possible. In this respect, it is especially preferred that the carbon monoxide concentration be reduced to 70% or lower, more preferably 50% or lower, most preferably 30% or lower of the original carbon concentration of the gas charged into this first step. For example, if it is reduced to 50% or lower, the amount of hydrogen loss in association with the CO oxidation-at the second step can be reduced and also the amount of heat generated in association with the oxidation too can be reduced. As a result, the temperature control of the reactor becomes easier and the CO oxidation can be effected reliably.

With the catalyst having the methanating ability for carbon monoxide, methanation of carbon dioxide too tends to occur. Then, by restricting this reaction, the consumption of hydrogen may be reduced to the necessity minimum. Moreover, by reducing the concentration of carbon monoxide discharged from the first step to be smaller than a predetermined amount, it becomes possible to remove carbon monoxide through its oxidation at the second step easily and reliably and the amount of oxidizing agent required may also be reduced.

Preferably, in the first step, a first metal catalyst comprising one or more kinds selected from the group consisting of Ru, Pt, Rh, Pd, is employed and a catalyst reaction layer is maintained at a temperature where methanation of carbon monoxide takes place by the first metal catalyst. This is because these catalysts are capable of methanation of carbon monoxide.

More particularly, it is preferred that the first metal catalyst be a high quantity metal supported catalyst comprising the one or more kinds selected from the group consisting of Ru, Pt, Rh, and Pd by 0.1 to 5 wt. % (more preferably 0.5 to 5 wt. %) supported on a catalyst support. In this if the metal content is lower than 0.1 wt. %, the methanation activity tends to be reduced. Whereas, if it exceeds 5 wt. %, no significant improvement in the methanation activity can be achieved.

Next, in the second step, a second metal catalyst comprising one or more kinds selected from the group consisting of Ru, Pt, Rh, and Pd is employed and a catalyst reaction portion is maintained at a temperature where oxidation of carbon monoxide takes place by the second metal catalyst involving addition of an oxidizing agent.

The catalysts, as described hereinbefore, cause methanation of carbon monoxide. But, at the same time, in the presence of a large amount of oxidizing agent (oxidizing atmosphere) and at a relatively low temperature, they act as catalysts for mainly oxidizing carbon monoxide. Accordingly, by using such metal as the second metal catalyst suitable for the object of the present invention, the reaction at its catalyst reaction layer is controlled to be limited to an oxidation reaction mainly. Whereby, the remaining portion of the carbon monoxide may substantially entirely be oxidized and removed.

More particularly, it is preferred that the second metal catalyst be a low quantity metal supported catalyst comprising the one or more kinds selected from the group consisting of Ru, Pt, Rh, and Pd by 0.1 to 5 wt. % (more preferably 0.1 to 2 wt. %) supported on a catalyst support. In this if the metal content is lower than 0.1 wt. %, the oxidation activity tends to be reduced. Whereas, if it exceeds 5 wt. %, no significant improvement in the oxidation activity can be achieved.

Further, in the above-described treatment of carbon monoxide, preferably, the total amount of the oxidizing agent supplied at the second step be below 3 chemical equivalents in oxygen conversion relative to the amount of carbon monoxide originally contained in the treatment-object gas, more preferably below 2 chemical equivalents, most preferably below the chemical equivalent. In this case, the consumption amount of hydrogen may be reduced sufficiently.

Also preferably, a second-catalyst reaction temperature which is the catalyst reaction temperature at the second step is set to be lower than a first-catalyst reaction temperature which is the catalyst reaction temperature at the first step.

Temperature suitable for methanation exists in a relatively high temperature range. Then, in order to cause the oxidation mainly, this should take place at a temperature range lower than the above temperature range. In such case, no heating operation becomes necessary in particular.

Further, as described hereinbefore, preferably, the method of the invention is applied to a reformed gas.

In the present invention, basically, the first step utilizes methanation reaction and the second step utilizes oxidation reaction. Then, it is desirable that the amount of hydrogen consumed at the first step be minimized. Therefore, the present inventors have conducted intensive research and achieved the following invention.

Namely, in removing carbon monoxide from a hydrogen-containing treatment-object gas, the treatment-object gas is exposed to a first metal catalyst capable of methanating carbon monoxide so as to remove the carbon monoxide as methane. In doing this, it is preferred that the methanation reaction be effected with setting the methanation reaction temperature higher than 160° C. and lower than 240° C.

With this, by setting the temperature higher than a predetermined temperature (higher than 160° C.), the methanation reaction will proceed to a certain degree, whereas by setting also this temperature lower than a predetermined temperature dower than 240° C.), it is possible to sufficiently restrict occurrence of methanation of carbon dioxide which tends to involve consumption of hydrogen. More preferably, the upper-limit temperature is set at 200° C.

In this case, such relatively low temperature range is employed for the methanation reaction. Therefore, it is preferred from the view point of catalyst reactivity, the first metal catalyst comprise catalyst containing Ru.

DETAILED DESCRIPTION OF THE PREFERRED EMBODIMENT

An example of mode of using a carbon-monoxide removing system according to the present invention will be described.

From a carbon-monoxide shift converter reactor, a treatment-object gas which contains a relatively large amount, i.e. about 6000 ppm to 1 wt. %, of carbon monoxide is guided to a first CO remover (incorporating a "high quantity metal supported catalyst"). Generally, this treatment-object gas contains no oxidizing component (oxygen).

Next, the treated treatment-object gas discharged from the first CO remover is guided to a second CO remover. In this second CO remover (incorporating a "low quantity metal supported catalyst"), to a trace amount of carbon monoxide which remains un-removed at the first CO remover, air or oxygen alone is added as an oxidizing agent to obtain $[O_2]/[CO]$ ratio of 0.5 to 4.5 and then a reaction is carried out at a relatively-low temperature range. In this, a CO sensor or the like may be provided between the second CO remover and the first CO remover so that the amount of oxidizing agent be controlled based on a detection value from this sensor.

The "high quantity metal supported catalyst" is a catalyst comprising 0.5 to 5 wt. % of one or more kinds of metal selected from the group consisting of Ru, Pt, Rh, and Pd supported on an alumina. The "low quantity metal supported catalyst" is a catalyst comprising 0.1 to 2 wt. % of one or more kinds of metal selected from the group consisting of Ru, Pt, Rh and Pd supported on an alumina support.

In each catalyst reaction, a value of GHSV (Gas Hourly Space Velocity: treatment-object gas flow amount/catalyst volume (1/h)) is set to about 500 to 100000/h (set to a practically possible range).

Further, the reaction temperature (° C.) at the first CO remover is set to a range from 155 to 300° C. Whereas, the reaction temperature at the second CO remover is set to a range from 50 to 250° C. lower than the reaction temperature at the first CO remover. That is, the former is set to be higher than the latter.

In the above, preferably, the reaction temperature of the first step at the first CO remover is set to 155 to 300° C. (more preferably, to 175 to 250° C.). And, preferably, the reaction temperature of the second step at the second CO remover is set to a relatively lower range of 50 to 250° C. (more preferably, to 100 to 160° C.). This is because the temperature range should differ in correspondence with each object.

If the temperature of the first step is lower than 155° C., the methanation activity tends to be lower. Whereas, if it is higher than 300° C., an influence of a side reaction tends to appear. Then, if the reaction (incorporating a "low quantity metal supported catalyst") to a trace amount of carbon monoxide which remains un-removed at the first CO remover, air or oxygen alone is added as an oxidizing agent to obtain $[O_2]/[CO]$ ratio of 0.5 to 4.5 and then a reaction is carried out at a relatively low temperature range. In this, a CO sensor or the like may be provided between the second CO remover and the first CO remover so that the amount of oxidizing agent be controlled based on a detection value from this sensor.

The "high quantity metal supported catalyst" is a catalyst comprising 0.5 to 5 wt. % of one or more kinds of metal selected from the group consisting of Ru, Pt, Rh, Pd and Ni supported on an alumina. The "low quantity metal supported catalyst" is a catalyst comprising 0.1 to 2 wt. % of one or more kinds of metal selected from the group consisting of Ru, Pt, Rh and Pd supported on an alumina.

In each catalyst reaction, a value of GHSV (Gas Hourly Space Velocity: treatment-object gas flow amount/catalyst volume (1/h)) is set to about 500 to 100000/h (set to a practically possible range).

Further, the reaction temperature (° C.) at the first CO remover is set to a range from 155 to 300° C. Whereas, the reaction temperature at the second CO remover is set to a range from 50 to 250° C. lower than the reaction temperature at the first CO remover. That is, the former is set to be higher than the latter.

In the above, preferably, the reaction temperature of the first step at the first CO remover is set to 155 to 300° C. (more preferably, to 175 to 250° C.). And, preferably, the reaction temperature of the second step at the second CO remover is set to a relatively lower range of 50 to 250° C. (more preferably, to 100 to 160° C.). This is because the temperature range should differ in correspondence with each object.

If the temperature of the first step is lower than 155° C., the methanation activity tends to be lower. Whereas, if it is higher than 300° C., an influence of a side reaction tends to appear. Then, if the reaction temperature is set to be lower than 250° C., methanation of carbon dioxide which is unnecessary in the present invention, can be restricted in particular. For achieving the restriction of methanation of carbon dioxide and promotion of methanation of carbon monoxide, an even more preferred range is a temperature range from 160° C. to 240° C.

On the other hand, at the second step, if the temperature range is set to be relatively low (lower than 250° C.), oxidation reaction will mainly take place, so that it becomes easier to reduce carbon monoxide to a sufficient level.

If the temperature of the second step is lower than 50° C., the reactivity will be low. Whereas, if it is higher than 250° C., it may happen that it becomes difficult to reduce carbon monoxide to be lower than several tens of ppm, due to a side effect such as a reverse-shift reaction (reverse water-gas shift reaction).

With the above arrangements, at the first CO remover, carbon monoxide is reacted with hydrogen in the treatment-object gas to be converted into methane at the relatively high temperature range according to a reaction formula: $CO+3H_2 \rightarrow CH_4+H_2O$, so that most of the carbon monoxide may be removed. This reaction can take place through appropriate control of the catalyst reaction temperature, substantially without aid of an oxidizing agent. In this case, the amount of carbon monoxide removable by the methanation reaction can be higher than 70% of that introduced into the first CO remover.

Next, at the second CO remover, mainly through a oxidation reaction involving an oxidizing agent according to a formula: $2CO+O_2 \rightarrow 2CO_2$, carbon monoxide is removed. This removal is possible to a level of several tens of ppm (preferably, 10 ppm) or lower. Hence, this may be suitably applied to a polymer electrolyte fuel cell.

Accordingly, for carbon monoxide contained in a treatment-object gas at a reaction outlet of a carbon monoxide shift converter, the conventional method requires oxygen three times in the mole ratio, i.e. 6chemical equivalents. On the other hand, according to the present invention, only with addition of air containing oxygen by a concentration lower than the chemical equivalent of the carbon monoxide, the carbon monoxide contained in the treatment-object gas may be removed. And, unnecessary consumption of hydrogen may be reduced correspondingly.

Further, even when air is selected as the oxidizing agent, the addition amount of air is small. Thus, the amount of nitrogen to be mixed into the treatment-object gas too can be reduced. Consequently, reduction in the partial pressure of the hydrogen in the treatment-object gas may be decreased.

By appropriate control of the reaction temperatures of the first CO remover and the second CO remover, it is possible to restrict such side reaction as: $CO_2+4H_2 \rightarrow CH_4+2H_2O$ or $CO_2+H_2 \rightarrow CO+H_2O$, etc. carbon monoxide may be removed very efficiently even when several tens of % of carbon dioxide is co-existent in the gas and the loss of hydrogen may be reduced.

The removing method of the invention is very suitable also for a case where methane is present in the treatment-object gas, since the method functions well in such case as well.

Further, comparing the reaction temperature of the first CO remover and the reaction temperature of the second CO remover to each other, the reaction temperature shifts from a high temperature to a low temperature along the flow passage.

Moreover, if the treatment-object gas is supplied to a low-temperature operating fuel cell such as a solid polymer electrolyte fuel cell by employing the method of the present invention, it is possible to supply fuel gas with lower efficiency reduction, by avoiding CO poisoning of the electrode catalyst of the fuel cell.

Figure 1:
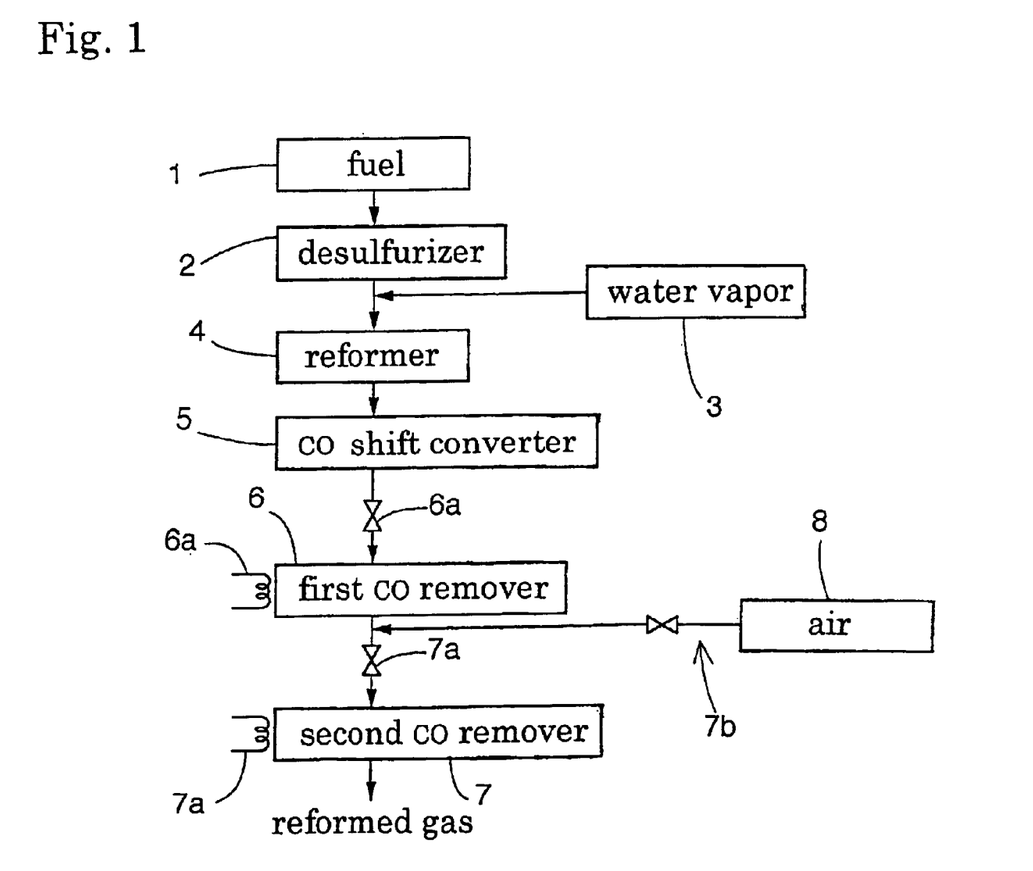
FIG. 1 is a view showing a first embodiment.

FIG. 1 shows a construction of a system according to a first embodiment of the present invention for removing carbon monoxide in a treatment-object gas. Fuel 1 consisting mainly of natural gas is introduced to a desulfurizer 2 to have its sulfur content removed. Next, this together with water vapor 3 is fed to a reformer 4 to be subjected to a reforming reaction. Subsequently, it is subjected to a carbon-monoxide shift reaction (water-gas shift reaction) at a carbon-monoxide transformer 5.

After this unit, there are disposed a first CO remover 6 and a second CO remover 7. To the second CO remover 7, air 8 is added as an oxidizing agent.

The first CO remover 6 is equipped with a first-catalyst reaction condition setting mechanism 6a for realizing a catalyst reaction condition at this remover suitable for this invention. This first-catalyst reaction condition setting mechanism 6a provides a flow control function for controlling the amount of reformed gas passing the remover 6 in relation with the amount of catalyst available and a temperature controlling function for controlling the reaction temperature, so that GHSV and the reaction temperature can be adjustably set. On the other hand, the second CO remover 7 is equipped with a second-catalyst reaction condition setting mechanism 7a which provides an equivalent function to the first-catalyst reaction condition setting mechanism 6a to the second remover 7. In general, in actual use, the SV value is fixed in a catalyst reaction. Therefore, the first-catalyst reaction condition setting mechanism 6a and the second-catalyst reaction condition setting mechanism 7a should be able to adjusting at least the temperature of the respective catalyst reaction portion.

The second CO remover 7 is further equipped with an oxidizing-agent adding mechanism 7b capable of adding an oxidizing agent with adjustment of its addition amount. The amount of this addition is set to be an oxidizing-agent amount just sufficient for the oxidation in relation with the CO concentration of the reformed gas at the entrance of the second CO remover 7. Needless to say, the oxidizing agent should not be supplied excessively.

Next, modes of using this system will be described.

[First Embodiment]

The first CO remover 6 was charged with catalyst (as a first metal catalyst and also as a high quantity metal supported catalyst) comprising 1 wt. % of ruthenium supported on granular alumina. Then, a reformed gas (humidified gas containing 6000 ppm of carbon monoxide, 5000 ppm of methane, 20% of carbon dioxide and 78.9% of hydrogen) obtained from the exit of carbon-monoxide shift converter 5 was introduced to this first CO remover 6, in which a methanation reaction of CO was effected at GHSV 3750–15000/h and at a temperature of 200 to 230° C.

Next, the second CO remover 7 was charged with catalyst (as a second metal catalyst and also as a low quantity metal supported catalyst) comprising 0.5 wt. % of ruthenium supported on granular alumina. The reformed gas obtained from the exit of this first CO remover 6 was introduced to the second CO remover 7. In this, air 8 containing oxygen by an amount corresponding to a ratio of 1.5 of $[O_2]/[CO]$ relative to the CO concentration of the reformed gas at the entrance of the second CO remover 7 was added, so that CO oxidation was effected at GHSV15000/h approximately and at 150° C.

The results are summarized and shown in Table 1 below.

TABLE 1

| example | first CO remover temperature (° C.) | SV value 1/h | exit CO concentration (ppm) | exit CO concentration of second CO remover (ppm) |
|---|---|---|---|---|
| 1 | 200 | 3750 | 353 | 0 |
| 2 | 200 | 5000 | 1627 | 0 |
| 3 | 210 | 5000 | 322 | 0 |
| 4 | 210 | 7500 | 1497 | 0 |
| 5 | 230 | 7500 | 223 | 0 |
| 6 | 230 | 15000 | 889 | 0 |

In the above, the CO concentration of the treatment-object gas introduced into the first CO remover was 6000 ppm. In the table above, as the value "0" as the CO concentration, the detection limit of CO concentration was 5 ppm.

Now, the concentrations of methane formed at the first CO remover the respective examples were as follows.

| example | first CO remover temperature (° C.) | exit CO concentration (ppm) | concentration of methane formed (ppm) |
|---|---|---|---|
| 1 | 200 | 353 | 7013 |
| 2 | 200 | 1627 | 4483 |
| 3 | 210 | 322 | 7179 |
| 4 | 210 | 1497 | 4577 |
| 5 | 230 | 223 | 10145 |
| 6 | 230 | 889 | 10803 |

The results show that CO removal was possible in each case with an amount of oxygen (the amount of oxidizing agent) smaller than the chemical equivalent of the amount of carbon monoxide entering the first CO remover

[Second Embodiment]

The first CO remover 6 was charged with catalyst (as a first metal catalyst and also as a high quantity metal supported catalyst) comprising 2 wt. % of ruthenium supported on granular alumina. Then, a reformed gas humidified gas containing 6000 ppm of carbon monoxide, 5000 ppm of methane, 20% of carbon dioxide and 78.9% of hydrogen) obtained from the exit of carbon-monoxide shift converter 5 was introduced to this first CO remover 6, in which a methanation reaction of CO was effected at GHSV 3750–5000/h and at a temperature of 220 to 260° C.

Next, the second CO remover 7 was charged with catalyst (as a second metal catalyst and also as a low quantity metal supported catalyst) comprising 1 wt. % of ruthenium supported on granular alumina. Then, the reformed gas from the exit of the first CO remover 6 was introduced to this second CO remover 7, in which with addition of air containing oxygen by an amount corresponding to $[O_2]/[CO]$ ratio of 1.3 relative to the CO concentration of the reformed gas at the entrance to this second CO remover 7, CO oxidation reaction was carried out at GHSV 15000/h approximately and at a temperature of 135° C.

The results are summarized and shown in Table 2 below.

TABLE 2

| example | first CO remover temperature (° C.) | SV value 1/h | exit CO concentration (ppm) | exit CO concentration of second CO remover (ppm) |
|---|---|---|---|---|
| 1 | 220 | 3750 | 1021 | 0 |
| 2 | 220 | 5000 | 1510 | 0 |
| 3 | 240 | 3750 | 803 | 0 |
| 4 | 240 | 5000 | 965 | 0 |
| 5 | 260 | 5000 | 1053 | 0 |

In the above, the CO concentration of the treatment-object gas introduced into the first CO remover was 6000 ppm. In the table above, as for the value "0" shown as the CO concentration, the detection limit of CO concentration was 5 ppm.

In this example too, substantially same results as the above example were obtained regarding the methane formed.

The results show that CO removal was possible in each case with an amount of oxygen (the amount of oxidizing agent) smaller than the chemical equivalent of the amount of carbon monoxide entering the first CO remover 6.

As described above, after the carbon-monoxide shift converter 5, there are provided the two stages of CO removers, i.e. the first CO remover 6 and the second CO remover 7. At the first CO remover 6, a major portion of CO contained in reformed gas is removed through its methanation. At the second CO remover 7, the remaining portion of CO is removed through its oxidation with addition of a trace amount of oxidizing agent. Consequently, it was possible to remove carbon monoxide from reformed gas while significantly reducing the amount of oxidizing agent to be added.

COMPARISON EXAMPLE 1

In this comparison example 1, catalyst comprising 2 wt. % of ruthenium supported on granular alumina was charged into a CO remover, into which a hydrogen balance gas having a carbon monoxide concentration of 6000 ppm, a carbon dioxide concentration of 20% and a methane concentration of 5000 ppm was added air containing 21% of oxygen (the ratio between gas and air: $[O_2]/[CO]=2$ approximately), and then this mixture was introduced at GHSV 5000/h at the reaction temperature of 150° C. When oxidation removal alone was conducted under this condition, it was found that 33 ppm of CO remain un-removed.

COMPARISON EXAMPLE 2

In this comparison example 2, catalyst comprising 2 wt. % of ruthenium supported on granular alumina was charged into a CO remover, into which a hydrogen balance gas having a carbon monoxide concentration of 6000 ppm, a carbon dioxide concentration of 20% and a methane concentration of 5000 ppm was introduced at GHSV 5000/h at the reaction temperature of 150° C. When the carbon monoxide removal by methanation was conducted under this condition, it was found that only about 100 ppm of the carbon monoxide was methanated.

OTHER MODES OF EMBODYING THE INVENTION (a) In the foregoing embodiments, the system includes the desulfurizer 2 and the carbon monoxide shift converter 5. Depending on the kind of fuel, however, they system may eliminate these. That is to say, the present invention does not provide any limitations in the process of forming the reformed gas before the carbon monoxide removing system.

In the above respect, however, the reformed gas should contain hydrogen to be used as a fuel gas as its main component thereof (more than about 50% on the dry basis) and also carbon monoxide to be removed.

In general, such reformed gas hardly contains such components as oxygen which is an oxidizing agent component.

(b) In the foregoing embodiments, air and oxygen are cited as examples of the oxidizing agent. Alternatively, the oxidizing element may be any. substance containing a certain component which can contribute to oxidation.

(c) In the foregoing embodiments, the first CO remover and the second CO remover are provided separately from each other. Instead, it is possible to provide, as a construction for effecting the above-described process, a single-container construction housing a catalyst for methanation disposed on the upstream side in the flow direction of the treatment-object gas having catalyst for methanation, a catalyst for oxidation disposed on the downstream side in the same direction with a mechanism for introducing an oxidizing agent to this portion.

In such case, the upstream portion of the container corresponds to the first CO remover and the downstream portion thereof corresponds to the second CO remover.

(d) Other embodiments of the present invention will be described next. [Other Embodiments]

The first CO remover 6 was charged with catalyst (as a first metal catalyst) comprising a granular alumina supporting 1 wt. % of rhodium. Then, a reformed gas (same as first and second embodiments) obtained from the exit of carbon-monoxide shift converter 5 was introduced to this first CO remover 6, in which a methanation reaction of CO was effected at GHSV 3750–7500/h and at a temperature of 260 to 300° C.

Next, the second CO remover 7 was charged with catalyst (as a second metal catalyst and also as a low quantity metal supported catalyst) comprising 1 wt. % of ruthenium supported on granular alumina. Then, the reformed gas from the exit of the first CO remover 6 was introduced to this second CO remover 7, in which with addition of air 8 containing oxygen by an amount corresponding to $[O_2]/[CO]$ ratio of 1.3 relative to the CO concentration of the reformed gas at the entrance to this second CO remover 7, CO oxidation reaction was carried out at GHSV 15000/h approximately and at a temperature of 135C.

The results are summarized and shown in Table 3 below.

TABLE 3

| example | first CO remover temperature (° C.) | SV value 1/h | exit CO concentration (ppm) | exit CO concentration of second CO remover (ppm) |
|---|---|---|---|---|
| 1 | 260 | 3750 | 1502 | 0 |
| 2 | 280 | 7500 | 1753 | 0 |
| 3 | 280 | 5000 | 728 | 0 |
| 4 | 300 | 7500 | 552 | 0 |
| 5 | 300 | 5000 | 217 | 0 |

In the above, the CO concentration of the treatment-object gas introduced into the first CO remover was 6000 ppm In the table above, as for the value "0" shown as the CO concentration, the detection limit of CO concentration was 5 ppm.

In this example too, substantially same results as the above example were obtained regarding the methane formed.

The results show that rhodium can be used also.

Further, by using the combination shown in the second embodiment of the first CO remover 6 comprising the ruthenium catalyst and the second CO remover 7 comrpising the ruthenium catalyst and under the conditions of example 1 (the example shown as example 1 in Table 2), the catalyst of the second CO remover 7 was replaced by 0.5 wt. % of platinum supported on granular alumina (an example of second metal catalyst). Then, the system was operated.

The operating conditions of the second CO remover 7 were: the catalyst reaction temperature 170° C.; GHSV 30000 and the addition amount of air: $[O_2]/[CO]=2.7$. With these, the carbon monoxide concentration was reduced to 0 ppm (below the actual detection limit). Therefore, platinum can be employed in the second CO remover in this invention.

Further, by using the combination shown in the first alternate embodiment of the first CO remover 6 composing the rhodium catalyst and the second CO remover 7 comprising the ruthenium catalyst and under the conditions of example 5 (the example shown as example 5 in Table 3), the catalyst of the second CO remover 7 was replaced by 1 wt. % of rhodium supported on granular alumina (an example of second metal catalyst). Then, the system was operated.

The operating conditions of the second CO remover 7 were: the temperature 250° C.; GHSV 15000 and the addition amount of air: $[O_2]/[CO]=4$. With these, in this case too, the carbon monoxide concentration at the exit of the second CO remover 7 was reduced to 0 ppm (below the actual detection limit). Therefore, rhodium can be employed in the second CO remover in this invention.

According to the present invention, the amount of oxidizing agent such as air or oxygen to be added in the course of removal of carbon monoxide from a reformed gas can be reduced significantly. Thus, CO removal of reformed gas is possible with minimizing loss of hydrogen by combustion.

Further, since in a fuel cell system methane produced by methanation of carbon monoxide can be used as a fuel for a burner of the reformer, it is possible to improve high efficiency of the system.

For this reason, it is possible to feed a fuel reformed gas with high efficiency to a low-temperature operating type fuel cell such as polymer electrolyte fuel cell using a fuel such as natural gas, methanol, etc.

Since the above-described method of the present invention allows efficient removal of carbon monoxide with a relatively high GHSV, the method provides the advantage of allowing the CO removers to be formed compact.

What is claimed is:

1. A method of removing carbon monoxide from a hydrogen-containing treatment-object gas containing hydrogen as its major component and carbon dioxide, the method comprising:

a first step of causing the treatment-object gas to contact a first metal catalyst comprising one or more kinds selected from the group consisting of Ru, Pt, Rh, and Pd and capable of methanating carbon monoxide at a temperature where methanation of carbon monoxide takes place by the first metal catalyst so that a portion of the carbon monoxide is removed through carbon monoxide methanation and where methanation of the carbon dioxide is restricted; and a second step of causing the treatment-object gas from the first step together with an oxidizing agent to contact a second metal catalyst capable of oxidizing carbon monoxide so that a remaining portion of carbon monoxide is removed mainly through carbon monoxide oxidation, wherein in the first step, a carbon monoxide concentration of the treatment-object gas is reduced to 30% or lower of an original carbon monoxide concentration of the treatment-object gas charged into the first step.

2. The method of removing carbon monoxide, according to claim 1, wherein in the second step, the second metal catalyst comprising one or more kinds selected from the group consisting of Ru, Pt, Rh and Pd is employed; and in the second step, a catalyst reaction layer is maintained at a temperature where oxidation of carbon monoxide takes place by the second metal catalyst involving addition of an oxidizing agent.

3. The method of removing carbon monoxide, according to claim 1, wherein a total amount of the oxidizing agent supplied at the second step is below about 3 chemical equivalents in oxygen conversion relative to an amount of carbon monoxide originally contained in the treatment-object gas introduced in the first step.

4. The method of removing carbon monoxide, according to claim 1, wherein a total amount of the oxidizing agent supplied at the second step is below the chemical equivalent in oxygen conversion relative to an amount of carbon monoxide originally contained in the treatment-object gas introduced in the first step.

5. The method of removing carbon monoxide, according to claim 1, wherein said hydrogen-containing treatment-object gas comprises a reformed gas supplied to a fuel cell as a fuel gas.

6. The method of removing carbon monoxide, according to claim 1, wherein in the second step, the second metal catalyst comprising one or more kinds selected from the group consisting of Ru, Pt, Rh and Pd is employed; and in the second step, a catalyst reaction layer is maintained at a temperature where oxidation of carbon monoxide takes place by the second metal catalyst involving addition of an oxidizing agent.

7. The method of removing carbon monoxide, according to claim 1, wherein a total amount of the oxidizing agent supplied at the second step is below about 3 chemical equivalents in oxygen conversion relative to an amount of carbon monoxide originally contained in the treatment-object gas introduced in the first step.

8. The method of removing carbon monoxide, according to claim 2, wherein a total amount of the oxidizing agent supplied at the second step is below about 3 chemical equivalents in oxygen conversion relative to an amount of carbon monoxide originally contained in the treatment-object gas introduced in the first step.

9. The method of removing carbon monoxide, according to claim 6, wherein a total amount of the oxidizing agent supplied at the second step is below about 3 chemical equivalents in oxygen conversion relative to an amount of carbon monoxide originally contained in the treatment-object gas introduced in the first step.

10. The method of removing carbon monoxide, according to claim 1, wherein a total amount of the oxidizing agent supplied at the second step is below the chemical equivalent in oxygen conversion relative to an amount of carbon monoxide originally contained in the treatment-object gas introduced in the first step.

11. The method of removing carbon monoxide, according to claim 2, wherein a total amount of the oxidizing agent supplied at the second step is below the chemical equivalent in oxygen conversion relative to an amount of carbon monoxide originally contained in the treatment-object gas introduced in the first step.

12. The method of removing carbon monoxide, according to claim 6, wherein a total amount of the oxidizing agent supplied at the second step is below the chemical equivalent in oxygen conversion relative to an amount of carbon monoxide originally contained in the treatment-object gas introduced in the first step.

13. The method of removing carbon monoxide, according to claim 1, wherein said hydrogen-containing treatment-object gas comprises a reformed gas supplied to a fuel cell as a fuel gas.

14. The method of removing carbon monoxide, according to claim 2, wherein said hydrogen-containing treatment-object gas comprises a reformed gas supplied to a fuel cell as a fuel gas.

15. The method of removing carbon monoxide, according to claim 3, wherein said hydrogen-containing treatment-object gas comprises a reformed gas supplied to a fuel cell as a fuel gas.

16. The method of removing carbon monoxide, according to claim 4, wherein said hydrogen-containing treatment-object gas comprises a reformed gas supplied to a fuel cell as a fuel gas.

17. The method of removing carbon monoxide, according to claim 6, wherein said hydrogen-containing treatment-object gas comprises a reformed gas supplied to a fuel cell as a fuel gas.

18. A method of operating a fuel cell system, where carbon monoxide is removed from a hydrogen-containing treatment-object gas containing hydrogen as its major component and carbon dioxide, comprising:

a first step of causing the treatment-object gas to contact a first metal catalyst comprising one or more kinds selected from the group consisting of Ru, Pt, Rh, and Pd and capable of methanating carbon monoxide at a temperature where methanation of carbon monoxide takes place by the first metal catalyst so that a portion of the carbon monoxide is removed through carbon monoxide methanation and methanation of the carbon dioxide is restricted;

a second step of causing the treatment-object gas from the first step together with an oxidizing agent to contact a second metal catalyst capable of oxidizing carbon monoxide so that a remaining portion of carbon monoxide is removed mainly through carbon monoxide oxidation; and using methane produced at the first step as a reforming fuel, wherein in the first step, a carbon monoxide concentration of the treatment-object gas is reduced to 30% or lower of an original carbon monoxide concentration of the treatment-object gas charged into the first step.

* * * * *

UNITED STATES PATENT AND TRADEMARK OFFICE
CERTIFICATE OF CORRECTION

PATENT NO. : 6,913,738 B1
DATED : July 5, 2005
INVENTOR(S) : Echigo et al.

It is certified that error appears in the above-identified patent and that said Letters Patent is hereby corrected as shown below:

Title page,
Item [57], ABSTRACT,
Line 9, "are co-existent For" should read -- are co-existent. For --.

Column 3,
Line 5, "methanation rein oval" should read -- methanation removal --.

Column 6,
Line 28, "dower than 240°C)" should read -- (lower than 240°C) --.

Column 7,
Line 5, delete text beginning with "In each catalyst" and ending at line 42 "supported on an alumina".

Column 8,
Line 36, "dower than 250°C)" should read -- (lower than 250°C) --; and "6chemical" should read -- 6 chemical --.
Line 52, "$H_2O$, etc. carbon" should read -- $H_2O$, etc. So that carbon --.

Column 10,
Line 18, "as the value "0"" should read -- as for the value "0" --.
Line 23, "the first CO remover the" should read -- the first CO remover for the --.
Line 40, "first CO remover" should read -- the first CO remover 6. --.
Line 48, "humidified gas" should read -- (humidified gas --.

Column 12,
Line 49, "of 135C" should read -- of 135°C --.

UNITED STATES PATENT AND TRADEMARK OFFICE
CERTIFICATE OF CORRECTION

PATENT NO. : 6,913,738 B1
DATED : July 5, 2005
INVENTOR(S) : Echigo et al.

It is certified that error appears in the above-identified patent and that said Letters Patent is hereby corrected as shown below:

Column 13,
Line 21, "remover 6 composing" should read -- remover 6 comprising --.

Signed and Sealed this

Eleventh Day of April, 2006

JON W. DUDAS
*Director of the United States Patent and Trademark Office*